(12) United States Patent
Scott (10) Patent No.: US 8,444,420 B2
(45) Date of Patent: May 21, 2013

(54) PROJECT MANAGEMENT GUIDEBOOK AND METHODOLOGY

(76) Inventor: Jason Scott, Sherman Oaks, CA (US)

( * ) Notice: Subject to any disclaimer, the term of this patent is extended or adjusted under 35 U.S.C. 154(b) by 636 days.

(21) Appl. No.: 12/649,298

(22) Filed: Dec. 29, 2009

(65) Prior Publication Data

US 2011/0014590 A1    Jan. 20, 2011

Related U.S. Application Data (60) Provisional application No. 61/141,205, filed on Dec. 29, 2008.

(51) Int. Cl.
*G09B 19/00* (2006.01)
*G06Q 10/00* (2006.01)

(52) U.S. Cl.
USPC ............................... 434/219; 705/301

(58) Field of Classification Search
USPC .................. 434/219; 717/101; 705/7.17, 7.23, 705/301
See application file for complete search history.

(56) References Cited

U.S. PATENT DOCUMENTS

| 7,890,921 | B2 * | 2/2011 | Munkvold et al. | 717/101 |
| 8,065,177 | B2 * | 11/2011 | Puccio et al. | 705/7.28 |
| 2005/0014122 | A1 * | 1/2005 | Ruvinsky et al. | 434/350 |
| 2005/0114829 | A1 * | 5/2005 | Robin et al. | 717/101 |
| 2008/0077530 | A1 * | 3/2008 | Banas et al. | 705/50 |
| 2008/0127040 | A1 * | 5/2008 | Barcellona | 717/101 |
| 2009/0006147 | A1 * | 1/2009 | Padmanabhan | 705/7 |
| 2009/0263769 | A1 * | 10/2009 | Sweeney | 434/107 |
| 2010/0082497 | A1 * | 4/2010 | Biesemann et al. | 705/301 |

* cited by examiner

*Primary Examiner* — Kang Hu
(74) *Attorney, Agent, or Firm* — Edwin Tarver; Lauson & Tarver LLP (57) ABSTRACT

A system for project management comprises a guidebook and a series of templates that accept input data from a user and calculate results based on the data. The resultant data is used to operate the system, which comprises the following components: a guidebook comprises the instructions for operating the method and all templates used during the method; standardized templates that are to be used for any project regardless of subject matter; weekly audits of project managers; a project manager certificate program; an auditor training program; a series of performance evaluations for project managers and auditors, and a series of performance analytics designed to correlate hours worked with performance quality to establish optimum task allocation for participants in the system.

23 Claims, 9 Drawing Sheets

PROJECT MANAGEMENT GUIDEBOOK AND METHODOLOGY

This application claims the benefit of the filing date of provisional application No. 61/141,205, filed on Dec. 29, 2008.

BACKGROUND

Processes for project management are known in the art. Presently, project managers construct forms for individual projects. Frequently, these forms are inapplicable to subsequent projects, for which new forms must be constructed. Project management training is also known in the art. Project Management Institutes educate project managers in efficient and effective ways to conduct project management activities but don't include training for specific projects.

It is therefore an object of the present invention to provide a project management system that includes all forms necessary to manage any project regardless of type. A further object of the invention is to provide a project management system that trains project managers as they execute the system while actually managing projects. Another object of the invention is to provide standardized templates that can be followed by project managers regardless of project type. Yet another object of the invention is to provide a comprehensive project manager and auditor training system that measures project manager performance and optimizes project manager performance through performance analytics. These and other objects will be discussed in the appended Summary, Description and Claims.

SUMMARY

The present invention is a project management system. The system enables practitioners to manage projects, regardless of subject, using a uniform and reproducible method. The system is characterized by several interacting components. These components and the entire system includes product updates on a periodic basis, the product update information comprising revisions to any system component.

Projects under the system are designed to operate in a series of phases, namely, a planning phase, a kick-off phase, a management can control phase, and a closure phase. Each of these phases are characterized by a different predetermine set of activities designed to move the project along from beginning to end. During the planning phase project owners are interviewed and facilitated sessions with project owners and executive stakeholders commenced. Daily and weekly activities also commence during this phase including setting up budgeting reports, audit scheduling, preparing kick-off phase activities, charter, work plan and related documents.

Following the planning phase, the kick-off phase commences. The kick-off phase is characterized by further developing the baseline budget for the project and establishing risk assessments, project change requests, a roles matrix, and communication plans. Daily, weekly and monthly activities are continued during this period, and approvals for continuing in to the next management phase obtained.

Following the Kick-off phase, a project enters the manage and control phase of the system. The manage and control phase is characterized by the management of planned work events. New activities performed during this phase include establishing risk assessments, project change requests, addenda to the roles matrix and communication plan as necessary, and continuing to perform the daily, weekly and monthly activities prescribed by the system.

Following the manage and control phases of the system, a project enters the closure phase wherein the goals of the project are completed, ratified and closed out. The closure phase is characterized by scheduling the closure document audit, final project review, turnover, project documentation audit, and final audit meetings. Auditor approval is obtained and daily and weekly activities continue. During the closure phase risk assessments are established as needed, along with project changes, roles matrix and communication plan addenda are continued as necessary. In the closure phase, the budget reports and final budget are updated, as well as the work plan and key deliverables status documents.

To complete the closure phase, a project manager conducts a turnover meeting, obtains project owner approvals, and acceptances from the steering committee and executive stakeholders as necessary. The project Guidebook is uploaded to the FTP site for publication. Finally reports are generated for the system operators and a final project audit conducted.

The phases of a project having been described, we now return to the components of the system. First among the components is the project management guidebook (Guidebook). The Guidebook instructs users as they execute the system and provides the physical structure within which project information is recorded and interpreted through predetermined method algorithms. More specifically, the Guidebook contains the communications rules governing project manager interaction with client executives and project participants. Additionally, the Guidebook contains project phase definitions; phase activity overviews; meeting management guidelines; and unplanned event procedures. Finally, the Guidebook establishes rules for defining the project, planning the project; managing the project budget; managing risk; reporting weekly project status; managing changes to the project and project closure.

The second component of the method is standardized templates correlating to the information in the Guidebook. Templates standardize how users of the project gather and record information when executing a project. Templates are incorporated into the Guidebook and cross-referenced with Guidebook instructions so that users of the system need not create original documents when operating the system. Templates are populated with information from project managers and in this manner become specific to individual projects.

The third component of the method is weekly audits providing constant monitoring of project performance and overall health. The weekly audits are associated with weekly audit checklists comprising standard checklist items relating to various stages of the method. These checklists govern not only information to be gathered in an audit, but also prescribe the scope and frequency of audits.

The fourth component of the method is a certification program to ascertain the point at which project managers have reached a predetermined skill level in executing the method for purposes of promotion. The certification program relies on audit checklists among other data sources, including an instructor-led training program for project managers. Preferably, training program eligibility is correlated to audit scores derived from audit checklist information.

The fifth component of the method is an auditor training program for project managers that reach a predetermined certification level. The auditor training program is designed as a part of the method to be executed regardless of the particulars of a given project since it covers method rules as they would apply to any project. Preferably, the auditor training is conducted on a one-on-one basis between an auditor trainer of a predetermined skill level and an auditor trainee.

The auditor training may comprise weekly audits and document reviews conducted by auditor trainees under auditor trainer supervision.

The sixth component of the method is a performance evaluation system providing performance evaluation worksheets bearing predetermined evaluation criteria for quantifying the proficiency level of a project manager or project auditor. The performance evaluation worksheets establish a quantifiable proficiency score, and performance above a predetermined score is used as a prerequisite and guide for earning promotions and yearly bonuses.

The seventh component of the method is performance analytics. Performance analytics are contained on template worksheets in the Guidebook. The performance analytics worksheets track billed hours and audit metrics, obtaining the metrics data from audit worksheets generated during a project. The metrics data is used to perform a diminishing returns analysis to determine optimal performance levels for project participants. Project managers and auditors can use the diminishing returns analysis to evenly distribute the project workload across a population of project participants.

The overall components of the method having been described, we return to the Guidebook for a more in-depth discussion of its contents. The Guidebook is divided into sections designed to familiarize persons new to the method with the various components of the method. The Guidebook also serves as an instruction manual for performing the method and is divided into sections. Preferably, the sections include a first communication protocols and definitions section. Communication protocols and definitions govern the type, frequency and content of communications between participants within a project. A second section provides an overview of activities to be performed for all phases of a project. These phases are defined in a preferred embodiment as a planning phase, project kick-off, manage/control and closure phase.

The Guidebook also contains a section governing meeting management and another for addressing unplanned work issues. In addition to sections concerning execution of the method, the Guidebook also comprises sections governing meeting management, work issue management, project initiation, progress management, weekly status reporting and processing, project definitions formation, project planning guidelines, budget and accounting guidelines, risk determination and management, project change management and project closure. The progress management section also comprises a milestone status tool for addressing completed project goals.

Templates are provided within the sections of the guidebook to serve as boilerplate documents upon which information is recorded. The templates also comprise electronic documents that automatically interpret information gathered by project managers. Minutes templates record the date, time, location, originator and meeting subject. These templates also have fields for entering information regarding the persons scheduled to attend, persons actually attending and persons absent from the meeting.

Other fields record agreements made during the meeting, issues discussed during the meeting and tasks resulting from the meeting. For the issue and task fields, the template records the "owner" responsible for resolving the issue or task and when the resolution is due. Typically, meeting minutes will be published on a daily basis as a project executes.

A second template incorporated into the Guidebook is the task log template which organizes tasks into a numerical order and wherein project managers input information relating to a task's start and finish date, including revised anticipated finish dates, completion dates and notes for assessing the "health" of the task during execution. In this context a task's health refers to an assessment of how well the task is moving toward completion and how well the task is being performed. A key goal of the task logs, particularly in their ability to assess task health is to capture and track unplanned work and issues that might alter the schedule of the project.

Similar to the task log is a template is the key deliverable status (KDS) template. Although this template also contains information regarding the start and finish dates of various project goals, it specifically contains information on the completion of various methodology steps, regardless of a project's subject matter. The key deliverables referred to in this template include recording successfully setting up the project binder, identifying project stake holders, kicking off weekly project meetings and establishing further key deliverables at the beginning of a project.

Key deliverables for the project planning phase include initiating weekly status reporting, establishing a project charter, establishing meeting standards, developing work plans and obtaining the necessary approvals, developing a roles matrix for project participants and obtaining the necessary approvals, developing a communications plan and obtaining the necessary approvals, updating the KDS template and publishing the planning phase documents to project teams.

Key deliverables for the kick-off phase, entered on the KDS template including the completion of the project team kick-off meeting, establishing the agreed upon work plan, roles matrix, communications plan, and further KDS items for subsequent project phases. Finally, the KDS confirms that a baseline project budget is established prior to entering the manage and control phase of a project. Another template provided by the system is the weekly status report generated by project managers to monitor the health of the overall project. The weekly status report provides an early warning to alert project participants of any unplanned issues or delays they may encounter.

A weekly status report template identifies the project period, project owner and project manager. Information entered on this template includes a summary of project status, issues currently affecting a project, current planned tasks and tasks planned for subsequent periods. Unplanned tasks are also recorded on an unplanned task log, which forms part of the template.

A charter template facilitates the production of a project charter to define the intended results of the project and what the project is intended to achieve. The charter template is divided into two portions. An overview defines the goals, objectives and benefits the project is intended to achieve. A second, scope portion defines the project in terms of the approach taken in accomplishing the project, tasks that fall within and outside the scope of the project, assumptions brought to the project by project planners, constraints that affect project deliverables and risks associated with executing the project. Following the formation of the charter, a work plan template translates the charter into an action plan.

A roles matrix template defines project roles and the responsibilities of persons performing the method. A communication plan template defines the communication types to be used during a project. Included in this template is information defining types of communication, the owner or communicator, the intended audience, the purpose of the communication, methods used for communication and the frequency of communication. Along with the communication template, document approval and acceptance forms are used to codify communications.

Other documents included in the templates preferably include a budget report document, risk assessment documents to assess risk relative to the projects end date and cost; project change requests to outline requested changes to scope or changes driven by risk; and a closure document that outlines what was completed in relation to what was defined in the charter.

Returning to the third component of the system, weekly audits are preferably accompanied by weekly audit checklists. Weekly audit checklists comprise indicia for quantifying project manager performance. Additionally, the audit checklists facilitate on-the-job training and establish the level and effectiveness of knowledge transfer in isolated management activities. Audit checklists also preferably comprise a formula for generating an overall audit score.

Weekly audits provide information used by the fourth component of the system, the certification program. The certification program comprises instructor-led project management training and a series of project manager training courses, wherein each course pertains to guideline and audit form information within the method, and an exam determining project manager proficiency in the method. Project manager status is achieved using a predetermine set of criteria. Preferably there are two classes of project managers, certified and uncertified. According to a preferred embodiment, in order to earn certification, a project manager must obtain exam eligibility by maintaining an average weekly audit score of no less than 95% during the preceding quarter; and wherein a minimum exam score of 90% is required to pass the exam. In one preferred embodiment of the system, spot audits are conducted for purposes of project manager evaluation.

Preferably, the exam comprises over 300 questions and utilizes Project Management Institute (PMI) standards with which project managers must be aware; and wherein the exam earns project managers with PMI certification the credits necessary to maintain certification. Voluntary instructor led training is offered to project managers wishing to sit for the certification exam; and wherein an average weekly audit score of 95% during the preceding quarter is required for instructor led training eligibility. Additionally, the training courses qualify for Professional Development Units (PDUs) necessary for project managers to maintain PMI certifications.

In order to train auditors to monitor project manager performance, the fourth component of the system, auditor training, is contemplated. Certification as an auditor is conducted using a predetermined set of criteria. In a preferred embodiment, there are two classes of auditors; auditor trainees and certified auditors. The auditor training program comprises audits conducted by a trained auditor while accompanied by an auditor trainee. The trained auditor performs weekly project audits and periodic document reviews of project managers. Then, after a predetermined number of training audits, the auditor trainee conducts audits and document reviews under auditor trainer supervision.

In order to become an auditor trainee, certification plus a prerequisite audit score is required. A project manager must first obtain project management certification by maintaining a 90% audit average for three consecutive quarters, attending all instructor led training and passing a certification exam. During training, a trainee always audits under a trainer. Once a trainee demonstrates audit mastery by standing in for a project manager without interruption on a project and has also completed 60 hours of instructor led training, they obtain an auditor credential.

In order to maintain the auditor credential, auditors are spot audited monthly. An account manager conducts the spot audit in place of a regular auditor. The score obtained during these spot audits must be within five percent of the previous audit score to pass. If an auditor fails a spot audit more than three times consecutively, auditor credential status is lost.

The sixth component of the system is the inclusion of performance evaluations on a daily and weekly basis to establish a quantitative measure of performance for users of the method. Project managers and auditors undergo performance evaluations on a daily and weekly basis against a predetermined set of criteria. The evaluation results are applied to a performance evaluation worksheet quarterly reflecting auditee proficiency and determining the propriety and scale of auditee promotion.

Evaluations score a variety of indicia, including professionalism & leadership as well as providing project audit scores and hourly billing quantification. These evaluations are performed quarterly, One aspect of project management where the performance evaluations are particularly useful is in establishing and normalizing billing rules for any particular project. Preferably, in order to maintain status as a project manager or auditor, project managers and auditors must maintain an average score of 95% and individual average weekly billing that is determined quarterly.

The seventh component of the system is a feed-back mechanism to maximize the work product of individual project participants. The work product analysis tool comprises a template to track billing hour averages. Once the billing hour averages are calculated, they are compared to audit metrics, including a project manager's audit scores. By establishing a calculus based on work product quality versus hourly billing averages, a diminishing returns analysis can be performed. The diminishing returns analysis template is automatically populated with data calculated by comparing billed hours against audit data to achieve a maximum preferred workload for each project manager and auditor.

DESCRIPTION

The present invention is a project management system. The system enables practitioners to manage projects, regardless of subject, using a uniform and reproducible method. The system is characterized by several interacting components. These components and the entire system includes product updates on a periodic basis, the product update information comprising revisions to any system component.

Figure 1:
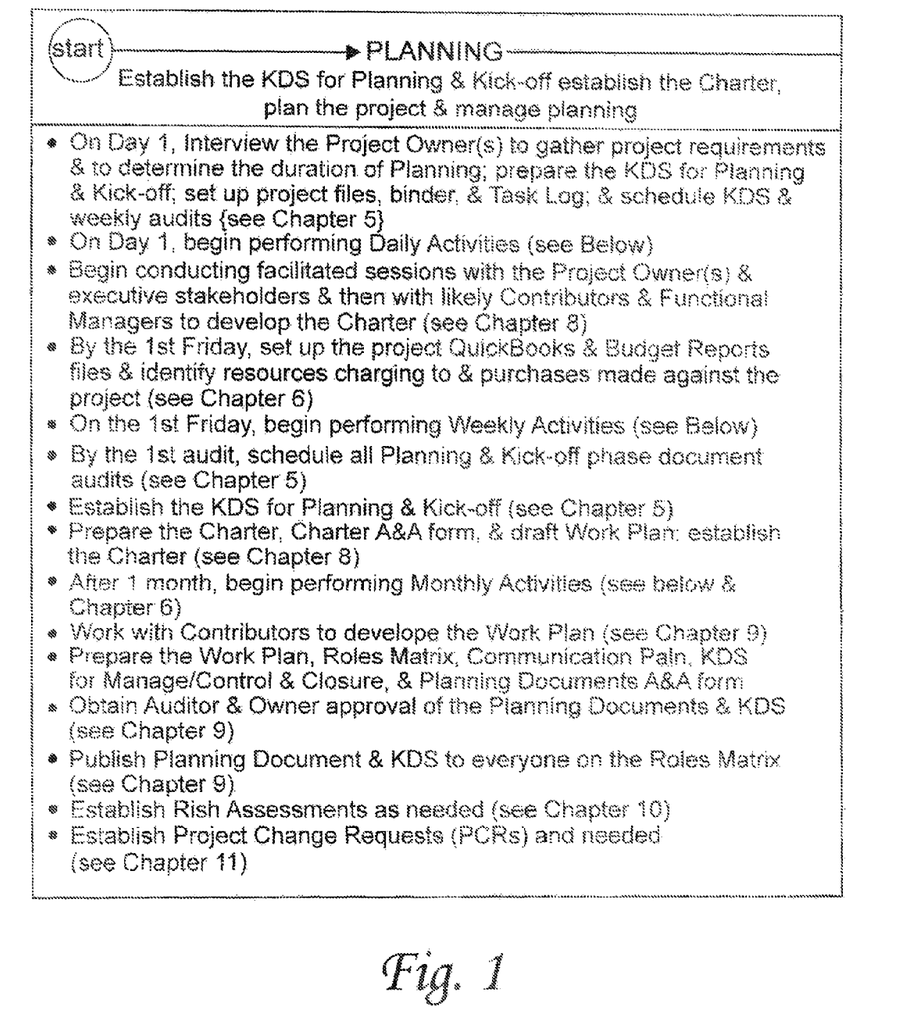
FIG. 1 is a chart showing the activities of the project planning phase.
Figure 2:
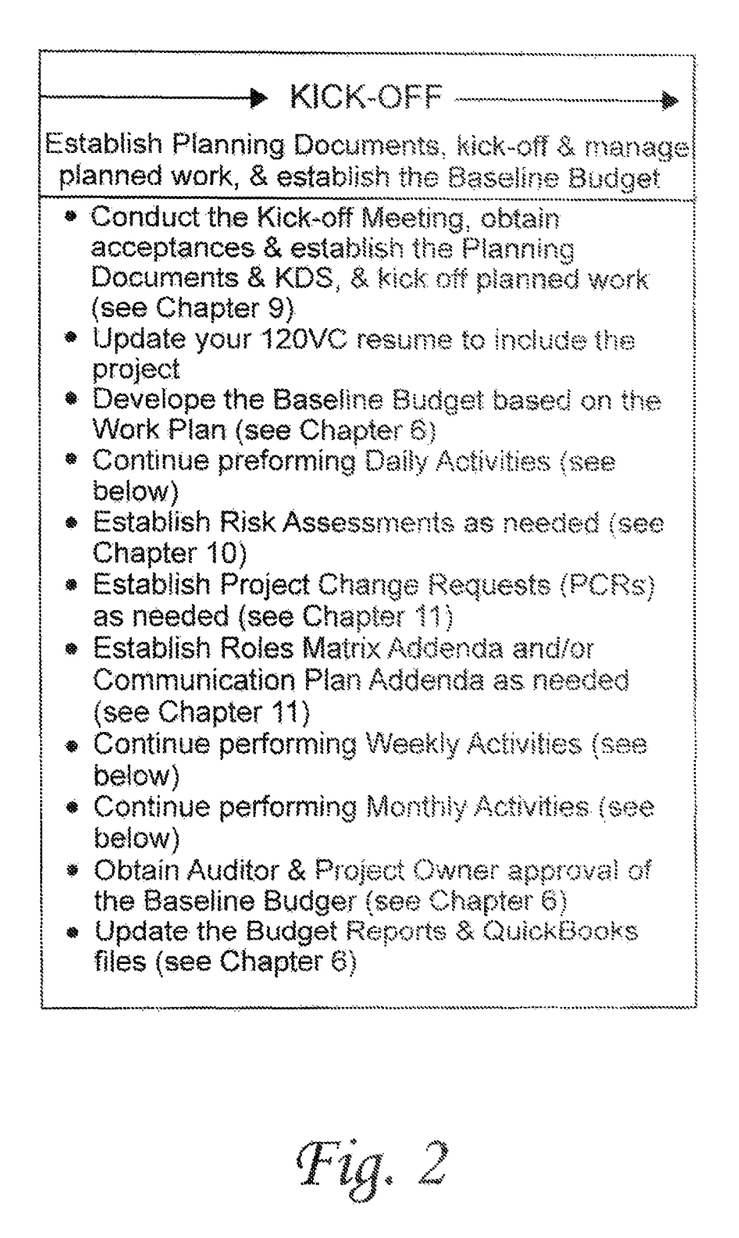
FIG. 2, is a chart showing the activities of the project kick-off phase.
Figure 3:
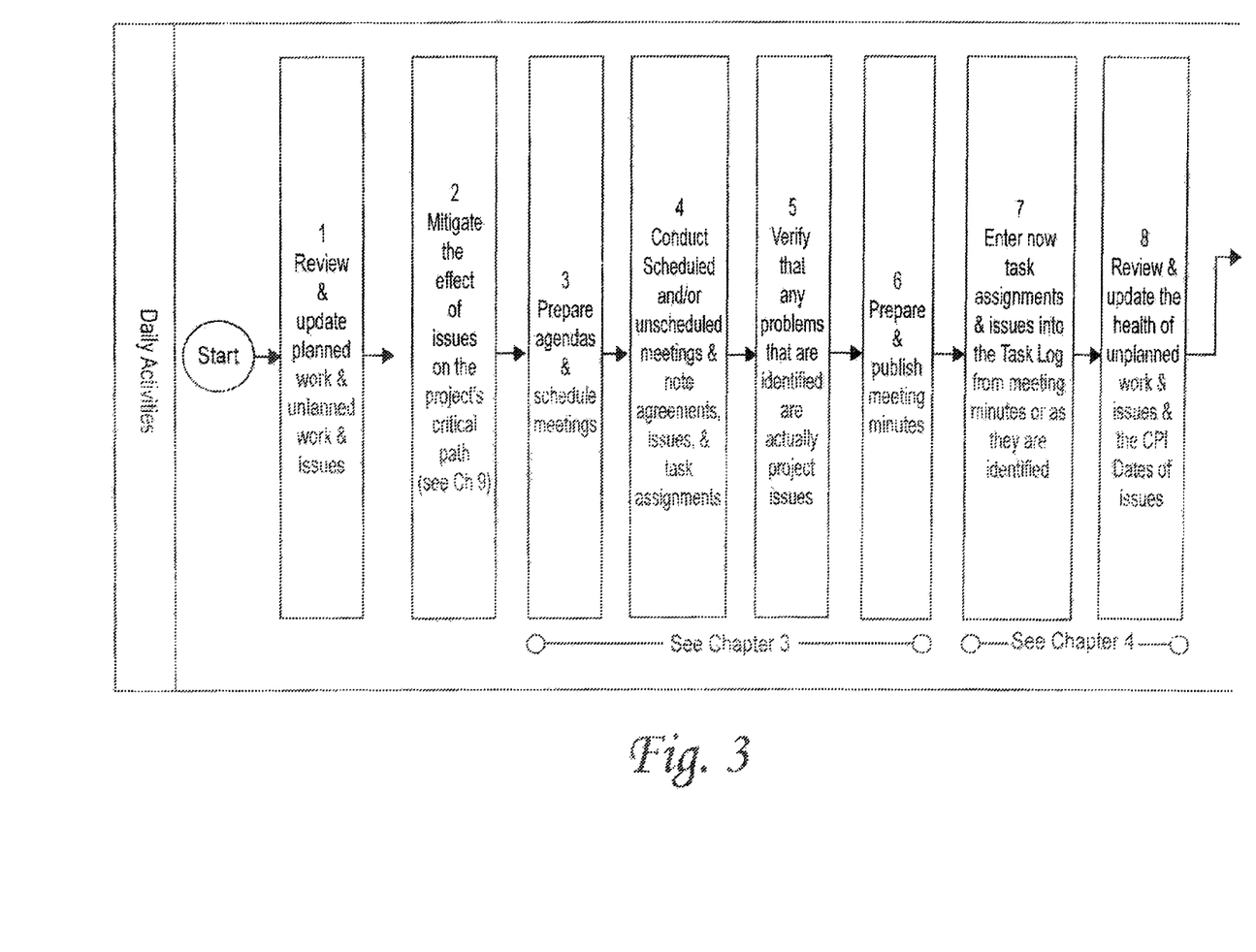
FIG. 3 is a flow chart showing daily activities to be performed during the planning and kick-off phases.
Figure 4:
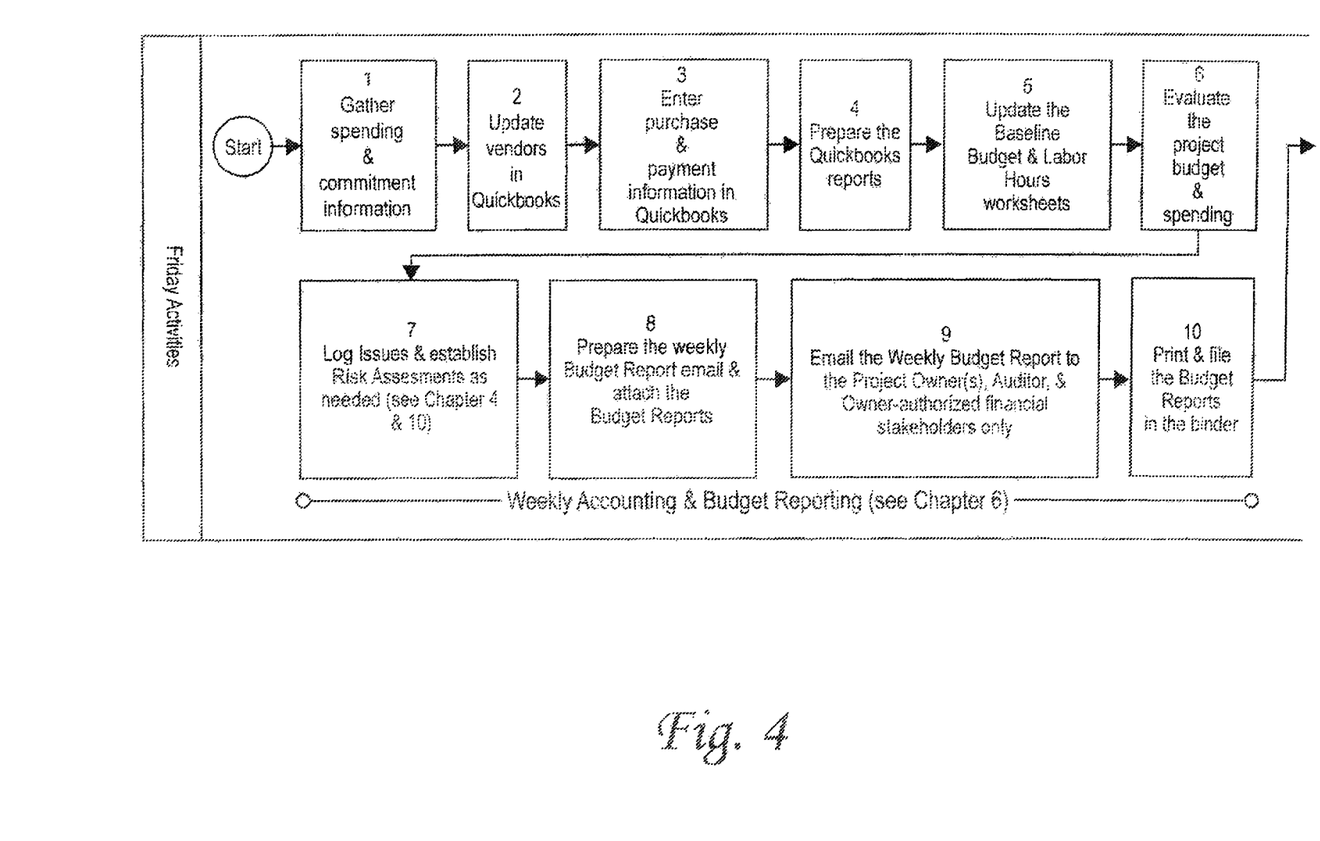
FIG. 4 is a flow chart showing weekly activities to be performed during the planning and kick-off phases.
Figure 5:
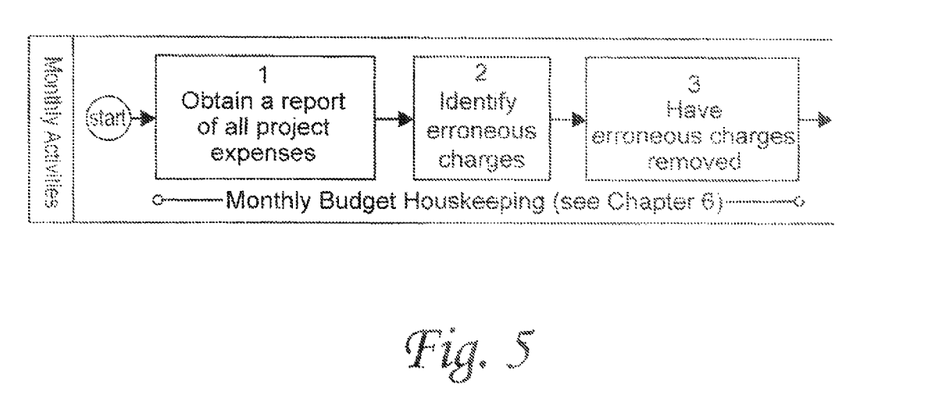
FIG. 5 is a flow chart showing monthly activities to be performed during the planning and kick-off phases.

Projects managed under the system are designed to operate through a series of phases: a planning phase, a kick-off phase, a management can control phase, and a closure phase. Each of these phases are characterized by a different predetermine set of activities designed to move the project along from beginning to end. During the planning phase project owners are interviewed and facilitated sessions with project owners and executive stakeholders commenced. Daily and weekly activities also commence during this phase including setting up budgeting reports, audit scheduling, preparing kick-off phase activities, charter, work plan and related documents. Referring to FIG. 1, a detailed explanation of planning phase activities is shown Following the planning phase, the kick-off phase commences. The kick-off phase is characterized by further developing the baseline budget for the project and establishing risk assessments, project change requests, a roles matrix, and communication plans. Daily, weekly and monthly activities are continued during this period, and approvals for continuing in to the next management phase obtained. Referring to FIG. 2, a detailed explanation of planning phase activities is shown. Referring now to FIG. 3, a detailed flow chart, showing daily activities to be performed during the planning and kick-off phases is shown. Referring to FIG. 4, a detailed flow chart, showing weekly activities to be performed during the planning and kick-off phases is shown. Referring to FIG. 5, a detailed flow chart, showing monthly activities to be performed during the planning and kick-off phases is shown.

Figure 6:
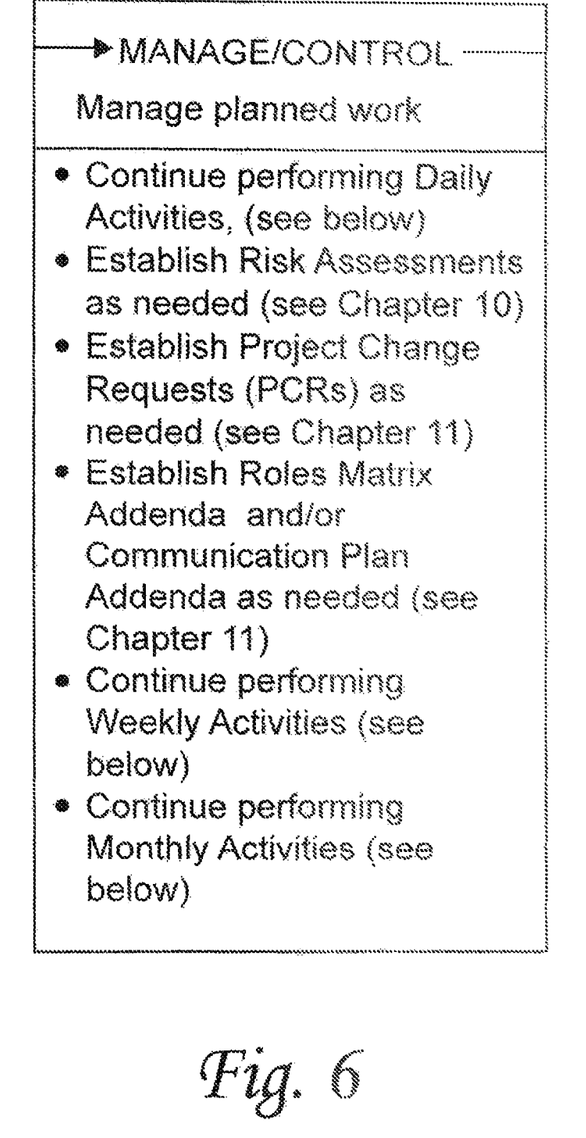
FIG. 6 is a chart showing the activities of the manage and control phase.

Following the Kick-off phase, a project enters the manage and control phase of the system. The manage and control phase is characterized by the management of planned work events. New activities performed during this phase include establishing risk assessments, project change requests, addenda to the roles matrix and communication plan as necessary, and continuing to perform the daily, weekly and monthly activities prescribed by the system. Referring to FIG. 6, a detailed explanation of manage and control phase activities is shown.

Following the manage and control phases of the system, a project enters the closure phase wherein the goals of the project are completed, ratified and closed out. The closure phase is characterized by scheduling the closure document audit, final project review, turnover, project documentation audit, and final audit meetings. Auditor approval is obtained and daily and weekly activities continue. During the closure phase risk assessments are established as needed, along with project changes, roles matrix and communication plan addenda are continued as necessary. In the closure phase, the budget reports and final budget are updated, as well as the work plan and key deliverables status documents.

Figure 7:
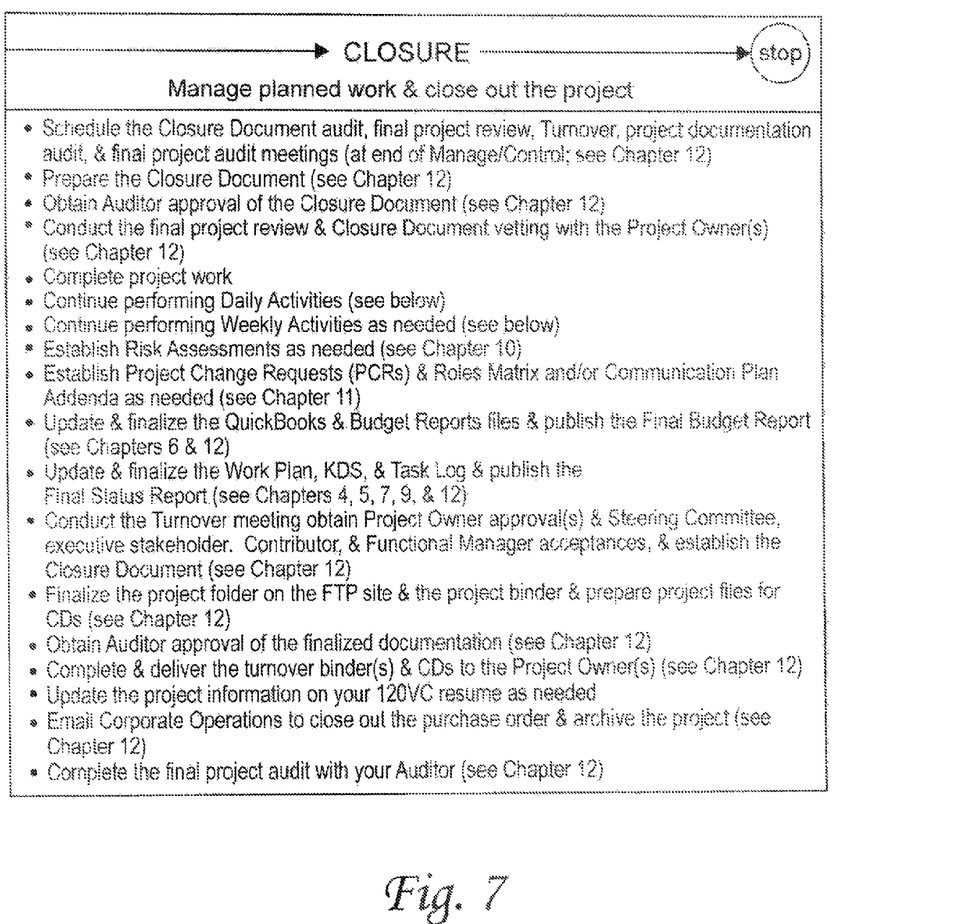
FIG. 7 is a chart showing the activities of the closure phase.
Figure 8:
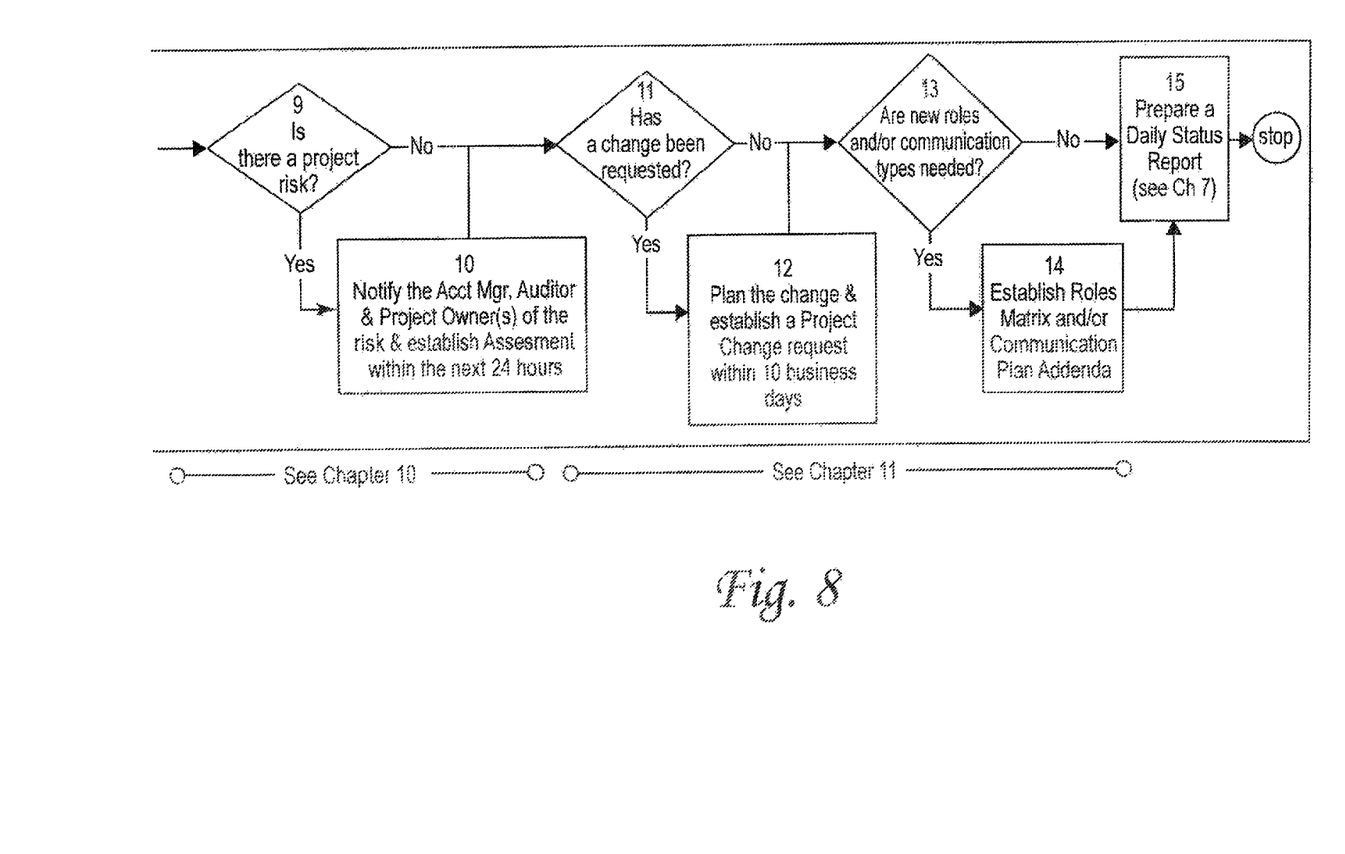
FIG. 8 is a flow chart showing daily activities performed in the manage and control, and closure phases.
Figure 9:
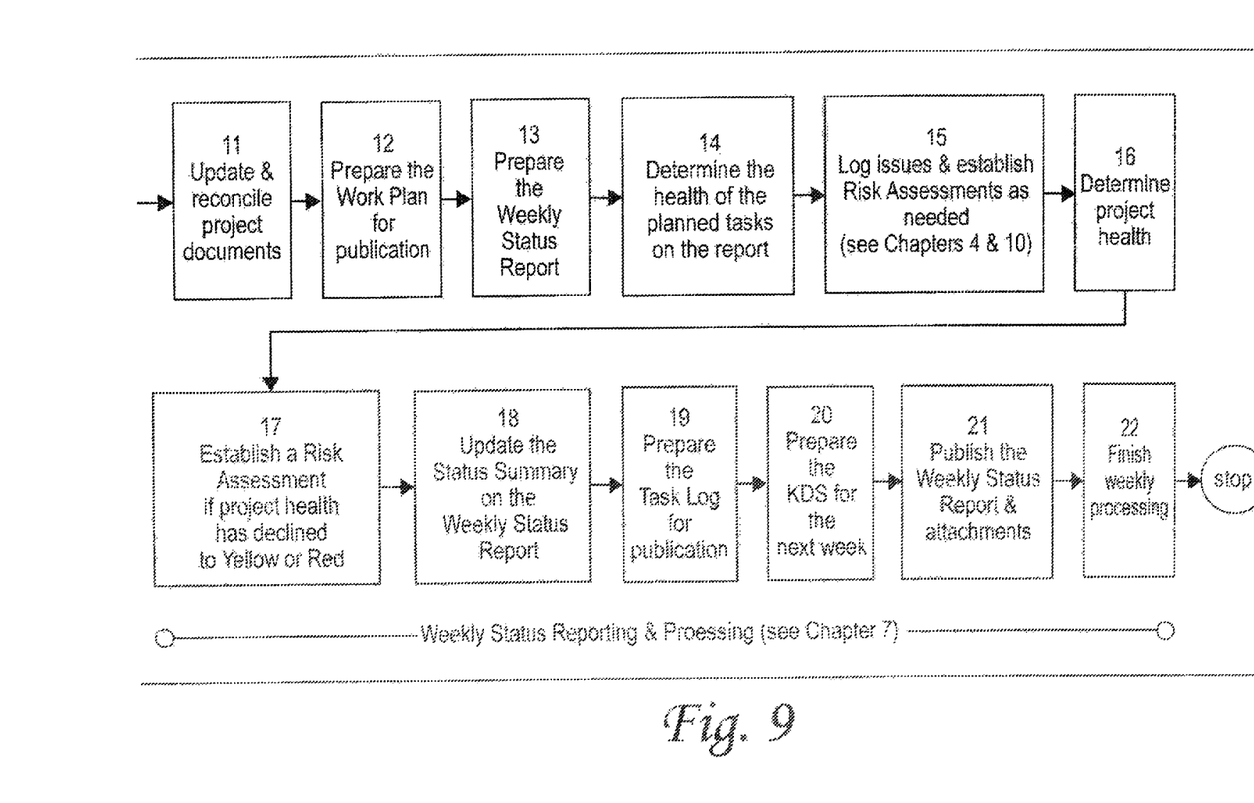
FIG. 9 is a flow chart showing weekly activities performed in the manage and control, and closure phases.

To complete the closure phase, a project manager conducts a turnover meeting, obtains project owner approvals, and acceptances from the steering committee and executive stakeholders as necessary. The project Guidebook is uploaded to the FTP site for publication. Finally reports are generated for the system operators and a final project audit conducted. Referring to FIG. 7, a detailed explanation of the closure phase is shown and described. Referring to FIG. 8, a detailed description of daily activities performed in the manage and control, and closure phases is shown. Referring to FIG. 9, a detailed description of weekly activities performed in the manage and control, and closure phases is shown.

First among these components is the project management guidebook (Guidebook). The Guidebook instructs users as they execute the system and provides the physical structure within which project information is recorded and interpreted through predetermined method algorithms. More specifically, the Guidebook contains the communications rules governing project manager interaction with client executives and project participants. Additionally, the Guidebook contains project phase definitions; phase activity overviews; meeting management guidelines; and unplanned event procedures. Finally, the Guidebook establishes rules for defining the project, planning the project; managing the project budget; managing risk; reporting weekly project status; managing changes to the project and project closure.

The second component of the method is standardized templates correlating to the information in the Guidebook. Templates standardize how users of the project gather and record information when executing a project. Templates are incorporated into the Guidebook and cross-referenced with Guidebook instructions so that users of the system need not create original documents when operating the system. Templates are populated with information from project managers and in this manner become specific to individual projects.

The third component of the method is weekly audits providing constant monitoring of project performance and overall health. The weekly audits are associated with weekly audit checklists comprising standard checklist items relating to various stages of the method. These checklists govern not only information to be gathered in an audit, but also prescribe the scope and frequency of audits.

The fourth component of the method is a certification program to ascertain the point at which project managers have reached a predetermined skill level in executing the method for purposes of promotion. The certification program relies on audit checklists among other data sources, including an instructor-led training program for project managers. Preferably, training program eligibility is correlated to audit scores derived from audit checklist information.

The fifth component of the method is an auditor training program for project managers that reach a predetermined certification level. The auditor training program is designed as a part of the method to be executed regardless of the particulars of a given project since it covers method rules as they would apply to any project. Preferably, the auditor training is conducted on a one-on-one basis between an auditor trainer of a predetermined skill level and an auditor trainee. The auditor training may comprise weekly audits and document reviews conducted by auditor trainees under auditor trainer supervision.

The sixth component of the method is a performance evaluation system providing performance evaluation worksheets bearing predetermined evaluation criteria for quantifying the proficiency level of a project manager or project auditor. The performance evaluation worksheets establish a quantifiable proficiency score, and performance above a predetermined score is used as a prerequisite and guide for earning promotions and yearly bonuses.

The seventh component of the method is performance analytics. Performance analytics are contained on template worksheets in the Guidebook. The performance analytics worksheets track billed hours and audit metrics, obtaining the metrics data from audit worksheets generated during a project. The metrics data is used to perform a diminishing returns analysis to determine optimal performance levels for project participants. Project managers and auditors can use the diminishing returns analysis to evenly distribute the project workload across a population of project participants.

The overall components of the method having been described, we return to the Guidebook for a more in-depth discussion of its contents. The Guidebook is divided into sections designed to familiarize persons new to the method with the various components of the method. The Guidebook also serves as an instruction manual for performing the method and is divided into sections. Preferably, the sections include a first communication protocols and definitions section. Communication protocols and definitions govern the type, frequency and content of communications between participants within a project. A second section provides an overview of activities to be performed for all phases of a project. These phases are defined in a preferred embodiment as a planning phase, project kick-off, manage/control and closure phase.

The Guidebook also contains a section governing meeting management and another for addressing unplanned work issues. In addition to sections concerning execution of the method, the Guidebook also comprises sections governing meeting management, work issue management, project initiation, progress management, weekly status reporting and processing, project definitions formation, project planning guidelines, budget and accounting guidelines, risk determination and management, project change management and project closure. The progress management section also comprises a milestone status tool for addressing completed project goals.

Templates are provided within the sections of the guidebook to serve as boilerplate documents upon which information is recorded. The templates also comprise electronic documents that automatically interpret information gathered by project managers. Minutes templates record the date, time, location, originator and meeting subject. These templates also have fields for entering information regarding the persons scheduled to attend, persons actually attending and persons absent from the meeting.

Other fields record agreements made during the meeting, issues discussed during the meeting and tasks resulting from the meeting. For the issue and task fields, the template records the "owner" responsible for resolving the issue or task and when the resolution is due. Typically, meeting minutes will be published on a daily basis as a project executes.

A second template incorporated into the Guidebook is the task log template which organizes tasks into a numerical order and wherein project managers input information relating to a task's start and finish date, including revised anticipated finish dates, completion dates and notes for assessing the "health" of the task during execution. In this context a task's health refers to an assessment of how well the task is moving toward completion and how well the task is being performed. A key goal of the task logs, particularly in their ability to assess task health is to capture and track unplanned work and issues that might alter the schedule of the project.

Similar to the task log is a template is the key deliverable status (KDS) template. Although this template also contains information regarding the start and finish dates of various project goals, it specifically contains information on the completion of various methodology steps, regardless of a project's subject matter. The key deliverables referred to in this template include recording successfully setting up the project binder, identifying project stake holders, kicking off weekly project meetings and establishing further key deliverables at the beginning of a project.

Key deliverables for the project planning phase include initiating weekly status reporting, establishing a project charter, establishing meeting standards, developing work plans and obtaining the necessary approvals, developing a roles matrix for project participants and obtaining the necessary approvals, developing a communications plan and obtaining the necessary approvals, updating the KDS template and publishing the planning phase documents to project teams.

Key deliverables for the kick-off phase, entered on the KDS template including the completion of the project team kick-off meeting, establishing the agreed upon work plan, roles matrix, communications plan, and further KDS items for subsequent project phases. Finally, the KDS confirms that a baseline project budget is established prior to entering the manage and control phase of a project. Another template provided by the system is the weekly status report generated by project managers to monitor the health of the overall project. The weekly status report provides an early warning to alert project participants of any unplanned issues or delays they may encounter.

A weekly status report template identifies the project period, project owner and project manager. Information entered on this template includes a summary of project status, issues currently affecting a project, current planned tasks and tasks planned for subsequent periods. Unplanned tasks are also recorded on an unplanned task log, which forms part of the template.

A charter template facilitates the production of a project charter to define the intended results of the project and what the project is intended to achieve. The charter template is divided into two portions. An overview defines the goals, objectives and benefits the project is intended to achieve. A second, scope portion defines the project in terms of the approach taken in accomplishing the project, tasks that fall within and outside the scope of the project, assumptions brought to the project by project planners, constraints that affect project deliverables and risks associated with executing the project. Following the formation of the charter, a work plan template translates the charter into an action plan.

A roles matrix template defines project roles and the responsibilities of persons performing the method. A communication plan template defines the communication types to be used during a project. Included in this template is information defining types of communication, the owner or communicator, the intended audience, the purpose of the communication, methods used for communication and the frequency of communication. Along with the communication template, document approval and acceptance forms are used to codify communications.

Other documents included in the templates preferably include a budget report document, risk assessment documents to assess risk relative to the projects end date and cost; project change requests to outline requested changes to scope or changes driven by risk; and a closure document that outlines what was completed in relation to what was defined in the charter.

Returning to the third component of the system, weekly audits are preferably accompanied by weekly audit checklists. Weekly audit checklists comprise indicia for quantifying project manager performance. Additionally, the audit checklists facilitate on-the-job training and establish the level and effectiveness of knowledge transfer in isolated management activities. Audit checklists also preferably comprise a formula for generating an overall audit score.

Weekly audits provide information used by the fourth component of the system, the certification program. The certification program comprises instructor-led project management training and a series of project manager training courses, wherein each course pertains to guideline and audit form information within the method, and an exam determining project manager proficiency in the method. Project manager status is achieved using a predetermine set of criteria. Preferably there are two classes of project managers, certified and uncertified. According to a preferred embodiment, in order to earn certification, a project manager must obtain exam eligibility by maintaining an average weekly audit score of no less than 95% during the preceding quarter; and wherein a minimum exam score of 90% is required to pass the exam. In one preferred embodiment of the system, spot audits are conducted for purposes of project manager evaluation.

Preferably, the exam comprises over 300 questions and utilizes Project Management Institute (PMI) standards with which project managers must be aware; and wherein the exam earns project managers with PMI certification the credits necessary to maintain certification. Voluntary instructor led training is offered to project managers wishing to sit for the certification exam; and wherein an average weekly audit score of 95% during the preceding quarter is required for instructor led training eligibility. Additionally, the training courses qualify for Professional Development Units (PDUs) necessary for project managers to maintain PMI certifications.

In order to train auditors to monitor project manager performance, the fourth component of the system, auditor training, is contemplated. Certification as an auditor is conducted using a predetermined set of criteria. In a preferred embodiment, there are two classes of auditors; auditor trainees and certified auditors. The auditor training program comprises audits conducted by a trained auditor while accompanied by an auditor trainee. The trained auditor performs weekly project audits and periodic document reviews of project managers. Then, after a predetermined number of training audits, the auditor trainee conducts audits and document reviews under auditor trainer supervision.

In order to become an auditor trainee, certification plus a prerequisite audit score is required. A project manager must first obtain project management certification by maintaining a 90% audit average for three consecutive quarters, attending all instructor led training and passing a certification exam. During training, a trainee always audits under a trainer. Once a trainee demonstrates audit mastery by standing in for a project manager without interruption on a project and has also completed 60 hours of instructor led training, they obtain an auditor credential.

In order to maintain the auditor credential, auditors are spot audited monthly. An account manager conducts the spot audit in place of a regular auditor. The score obtained during these spot audits must be within five percent of the previous audit score to pass. If an auditor fails a spot audit more than three times consecutively, auditor credential status is lost.

The sixth component of the system is the inclusion of performance evaluations on a daily and weekly basis to establish a quantitative measure of performance for users of the method. Project managers and auditors undergo performance evaluations on a daily and weekly basis against a predetermined set of criteria. The evaluation results are applied to a performance evaluation worksheet quarterly reflecting auditee proficiency and determining the propriety and scale of auditee promotion.

Evaluations score a variety of indicia, including professionalism & leadership as well as providing project audit scores and hourly billing quantification. These evaluations are performed quarterly, One aspect of project management where the performance evaluations are particularly useful is in establishing and normalizing billing rules for any particular project. Preferably, in order to maintain status as a project manager or auditor, project managers and auditors must maintain an average score of 95% and individual average weekly billing that is determined quarterly.

The seventh component of the system is a feed-back mechanism to maximize the work product of individual project participants. The work product analysis tool comprises a template to track billing hour averages. Once the billing hour averages are calculated, they are compared to audit metrics, including a project manager's audit scores. By establishing a calculus based on work product quality versus hourly billing averages, a diminishing returns analysis can be performed. The diminishing returns analysis template is automatically populated with data calculated by comparing billed hours against audit data to achieve a maximum preferred workload for each project manager and auditor.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A project management method comprising the steps of:
   a. creating a cross referenced project management binder having individual sequential instructions for planning and managing projects, the binder comprising:
      i. pages comprising communication rules governing project manager interaction with client executives and project participants;
      ii. pages comprising project phase definitions and phase activity overviews; meeting management and unplanned event procedures; and
      iii. pages comprising rules for defining the project, project planning, budgeting and budget management, risk management, weekly status reporting, change management and project closure;
   b. creating standardized templates correlated to the binder, the templates governing and standardizing project information recordation as a project executes;
   c. providing weekly audit checklists comprising standardized checklist forms, further comprising items relating to stages of the project to be audited at predetermined intervals throughout execution of the project;
   d. establishing a certification program to certify project managers who have reached a predetermined experience level as reflected by audit checklists and exams, the certification program also incorporating an instructor-led training program for project managers, wherein training program eligibility is also determined according to a predetermined, scale using audit checklist information;
   e. establishing an auditor training program for methodology participants that reach the certification level, wherein auditor training is conducted on a one-on-one basis and comprises weekly audits and document reviews conducted by trainees under auditor trainer supervision;
   f. creating performance evaluation worksheets comprising predetermined evaluation criteria for quantifying the levels of proficiency of project managers and auditors, wherein minimum evaluation scores comprise prerequisites for promotion and yearly bonus; and g. creating performance analytics worksheets comprising templates for tracking billed hours, audit metrics for criteria quantified on audit worksheets, and a diminishing returns analysis for redistributing the workload across a population of project managers.

2. The method of claim 1, wherein the binder comprises sections chosen from the list of communication protocols and definitions to govern the type, frequency and content of communications within a project; an overview of activities to be performed in all phases of a project; meeting management guidelines; unplanned work issue management guidelines; project initiation and progress management including a milestone status tool; weekly status reporting and processing: project definition formation guidelines; project planning guidelines; project budget and accounting guidelines; project risk determination and management; project change management; and project closure.

3. The method of claim 1, wherein the binder comprises templates chosen from the list of: meeting minutes; task log to capture and track unplanned work and issues; Key Deliverable Status Tool; weekly status report; charter document defining what the project is intended to achieve; work plan document translating the charter into an action plan; roles matrix document defining project roles and responsibilities of persons performing method; communication plan document defining communication types to be used during a project; document approval and acceptance forms; budget report document; risk assessment documents to assess risk relative to the projects end date and cost; a project change request to outline requested changes to scope or changes driven by risk; and a closure document that outlines what was completed in relation to what was defined in the charter.

4. The method of claim 1, wherein weekly audit checklists comprise indicia for quantifying project manager performance, on the job training and the level of knowledge transfer in isolated management activities and a formula for generating an overall audit score.

5. The method of claim 1, wherein the instructor-led project management training comprises a series of project manager training courses, wherein each course pertains to guideline and audit form information within the method, and an exam determining project manager proficiency in the method.

6. The method of claim 5 wherein in order to earn certification, a project manager must obtain exam eligibility by maintaining an average weekly audit score of no less than 95% during the preceding quarter; and wherein a minimum exam score of 90% is required to pass the exam.

7. The method of claim 6 wherein the exam comprises over 300 questions and utilizes Project Management Institute (PMI) standards with which project managers must be aware; and wherein the exam earns project managers with PMI certification the credits necessary to maintain certification.

8. The method of claim 6 wherein voluntary instructor led training is offered to project managers wishing to sit for the certification exam; and wherein an average weekly audit score of 95% during the preceding quarter is required for instructor led training eligibility.

9. The method of claim 8 wherein the training courses qualify for Professional Development Units (PDUs) necessary for project managers to maintain PMI certifications.

10. The method of claim 1, wherein the auditor training program comprises audits conducted by a trained auditor accompanied by an auditor trainee wherein the trained auditor performs weekly project audits and periodic document reviews of project managers, and wherein after a predetermined number of training audits, the auditor trainee conducts audits and document reviews under auditor trainer supervision.

11. The method of claim 10 wherein to become an auditor trainee, a project manager must first obtain project management certification by maintaining a 90% audit average for three consecutive quarters, attending all instructor led training and passing a certification exam.

12. The method of claim 10 wherein during training, a trainee always audits under a trainer; and wherein once a trainee demonstrates audit mastery by standing in for a project manager without interruption on a project; and wherein the trainee has also completed 60 hours of instructor led training, they obtain an auditor credential.

13. The method of claim 12 wherein in order to maintain auditor credentials, auditors are spot audited monthly; and wherein an account manager conducts the spot audit in place of the regular auditor; and wherein the audit score must be within five percent of the previous audit score to pass; and wherein if an auditor fails a spot audit more than three times consecutively, auditor credential status is lost.

14. The method of claim 1, wherein project managers and auditors undergo performance evaluations on a daily and weekly basis against a predetermined set of criteria, and wherein evaluation results are applied to a performance evaluation worksheet quarterly reflecting auditee proficiency and determining the propriety and scale of auditee promotion.

15. The method of claim 14 wherein the criteria includes a method of quantifying professionalism & leadership as well as a project audit score and hourly billing, and wherein evaluations are performed quarterly.

16. The method of claim 15 wherein in order to maintain status as a project manager or auditor, a project manager or auditor must maintain an average score of 95% and individual average weekly billing that is determined quarterly.

17. The method of claim 1, wherein the work product analysis comprises a template to track billing hour averages, audit metrics including a project manager's audit scores, and a diminishing returns analysis.

18. The method of claim 17 wherein the diminishing returns analysis is automatically populated with data calculated by comparing billed hours against audit data to achieve a maximum preferred workload for each project manager and auditor.

19. The method of claim 1, wherein the method includes product updates on a periodic basis, the product update information comprising revisions to any method component.

20. The method of claim 1, wherein the methodology comprises a predetermined set of proficiency levels.

21. The method of claim 20 wherein the proficiency levels comprise at least two categories of project managers and two categories of auditors.

22. The method of claim 21 wherein predetermined audit score levels are necessary to advance to a higher category as a project manager and predetermined spot audit score levels are necessary to advance to a higher category as an auditor.

23. The method of claim 21 wherein certification is necessary in addition to a predetermined audit score level to advance from the project manager level to the auditor level.

* * * * *